United States Patent
Prudhomme

(10) Patent No.: US 11,116,216 B2
(45) Date of Patent: Sep. 14, 2021

(54) HERBICIDE FORMULATIONS AND METHODS

(71) Applicant: SIPCAM AGRO, USA, INC., Durham, NC (US)

(72) Inventor: Michael Prudhomme, Natchez, LA (US)

(73) Assignee: Sipcam Agro USA, Inc., Durham, NC (US)

( * ) Notice: Subject to any disclaimer, the term of this patent is extended or adjusted under 35 U.S.C. 154(b) by 147 days.

(21) Appl. No.: 16/681,519

(22) Filed: Nov. 12, 2019

(65) Prior Publication Data

US 2020/0146290 A1 May 14, 2020

Related U.S. Application Data

(60) Provisional application No. 62/760,005, filed on Nov. 12, 2018.

(51) Int. Cl.
| | |
|---|---|
| *A01N 43/70* | (2006.01) |
| *A01N 25/30* | (2006.01) |
| *A01N 33/18* | (2006.01) |
| *A01N 43/42* | (2006.01) |
| *A01N 47/36* | (2006.01) |
| *A01N 43/50* | (2006.01) |

(52) U.S. Cl.
CPC .......... *A01N 43/70* (2013.01); *A01N 25/30* (2013.01); *A01N 33/18* (2013.01); *A01N 43/42* (2013.01)

(58) Field of Classification Search
CPC ........ A01N 43/70; A01N 25/30; A01N 33/18; A01N 43/42; A01N 47/36; A01N 43/50
See application file for complete search history.

(56) References Cited

U.S. PATENT DOCUMENTS

2014/0274717 A1* 9/2014 Shroff .................. A01N 43/707
504/271

* cited by examiner

*Primary Examiner* — Trevor Love
(74) *Attorney, Agent, or Firm* — Wiley Rein LLP

(57) ABSTRACT

The present embodiments provide formulations for controlling *Veronica arvensis* growth on turfgrass consisting of (a) a herbicidally effective amount of a combination of imazaquin, prodiamine, and simazine as active ingredients, and (b) at least one agronomically acceptable excipient, wherein said formulation exhibits superior control of *V. arvensis* compared with any of the active ingredients alone. Also disclosed herein are methods of controlling *V. arvensis* growth in grass and broadleaf comprising contacting said turfgrass with a herbicidally effective amount of a formulation consisting of (a) a combination of imazaquin, prodiamine, and simazine as active ingredients, and (b) at least one agronomically acceptable excipient, wherein said formulation exhibits superior control of *V. arvensis* growth.

15 Claims, 1 Drawing Sheet

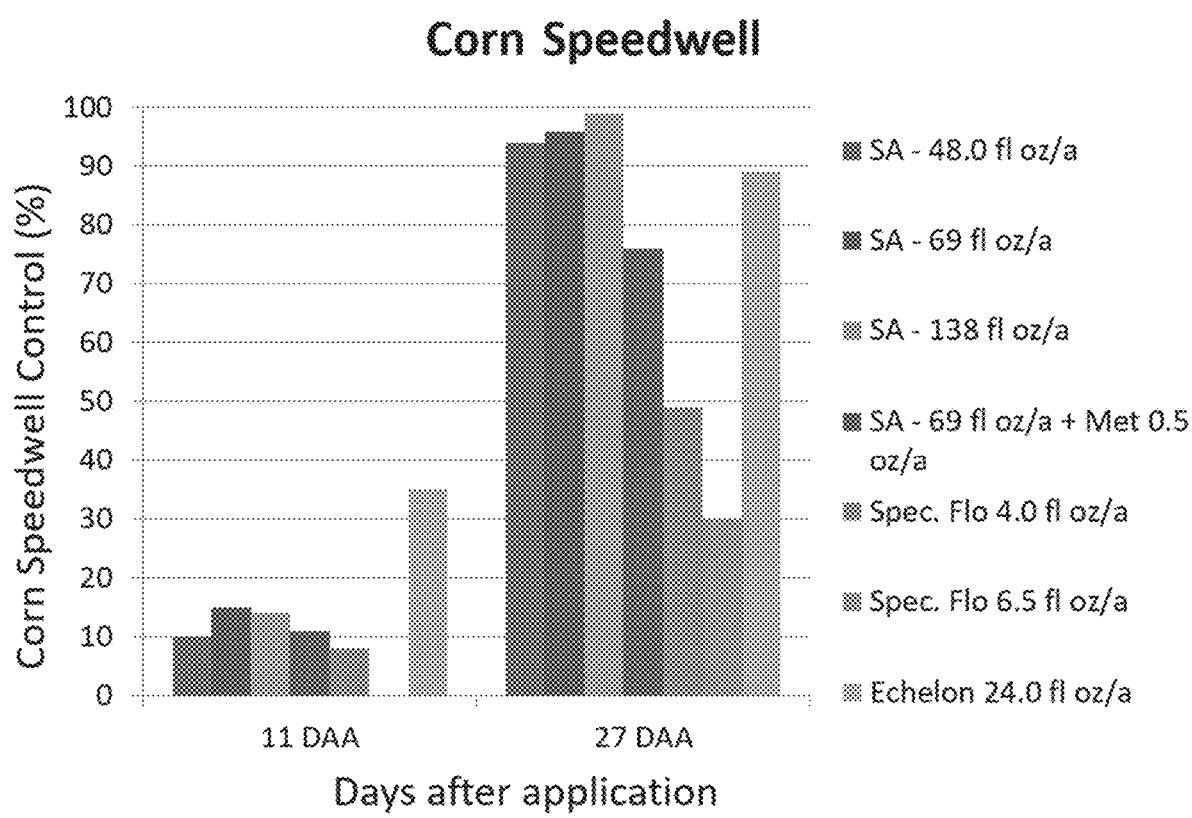

HERBICIDE FORMULATIONS AND METHODS

RELATED APPLICATIONS

This Application claims the priority benefit of U.S. Provisional Application No. 62/760,005, filed Nov. 12, 2018, which is incorporated fully herein by reference for all purposes.

FIELD

The present disclosure relates to the use of herbicidal formulations and methods, providing efficient and reliable post-emergence control of weeds, in particular *Veronica arvensis* (corn speedwell), in turfgrass.

BACKGROUND

Maintaining a high quality and healthy lawn or turf is of continued importance to sporting industries such as golf, baseball and football, as well as to residential or institutional lawns, public green areas, sod farms, etc. For the purpose of controlling weeds in turfgrass, the agrochemicals or herbicides to be applied have to show a selective action against annual or perennial weeds without substantial injury to the lawn or turf, and many have to be applied to the soil surface prior to the germination and emergence of the weeds (pre-emergence or preventive treatment) or after the germination and emergence of the weeds from the soil (post-emergence or curative treatment). Current herbicidal formulations can expand the efficacy of these treatments, yet some weeds persist in these turfgrass.

An example of a small, low-growing, invasive winter annual weed is *Veronica arvensis* (corn speedwell) that reproduces and spreads only by seeding, germinates in the fall or winter, and grows during any warm weather (including warm winter) but remains somewhat dormant during the winter. It resumes growth and produces seed in the spring and dies as temperatures increase in late spring and early summer. Although it has a fibrous root system that can be pulled by hand when the soil is moist, and will not re-grow from the roots if its leaves and stems are removed, hand-weeding is not a practical solution for commercial turf and large lawns. Additionally, corn speedwell is classified as hard to control with herbicides. More specifically, although application of pre-emergence herbicides in the fall may prevent corn speedwell seeds from sprouting, once this weed has invaded an area of turf or lawn it is hard to control and continues to spread. In other words, the use of pre-emergent herbicides may not be effective in controlling corn speedwell post-emergence. Therefore, a continuing need exists for new herbicidal formulations and methods to control post-emergent growth of corn speedwell in turfgrass.

SUMMARY OF THE INVENTION

The embodiments described herein provide compositions and methods of controlling weeds, such as *Veronica arvensis*, in turfgrass. One aspect of the present embodiments provides an herbicidal formulation for controlling weeds such as *V. arvensis*, in turfgrass consisting of (a) a combination of imazaquin, prodiamine, and simazine as active ingredients, and (b) at least one agronomically acceptable excipient. Another aspect of the present embodiments provides a method of controlling weeds, such as *V. arvensis*, in turfgrass, comprising contacting the turfgrass with an herbicidally effective amount of a formulation consisting of (a) a combination of imazaquin, prodiamine, and simazine as active ingredients, and (b) at least one agronomically acceptable excipient. In at least one embodiment, this formulation exhibits superior control of *V. arvensis* growth as compared with any one of the active ingredients administered alone, particularly when applied to post-emergent weeds.

Examples of turfgrass that can be treated with the formulation according to the present embodiments include Bermuda grass, centipedegrass, St. Augustine grass, and Zoysiagrass.

In at least one embodiment, the formulation is capable of controlling *V. arvensis* growth pre-emergence or post-emergence.

In at least embodiment, the active ingredients are present in the formulation as follows: about 16 wt % to about 19 wt % prodiamine, about 24 wt % to about 30 wt % simazine, and about 7 wt % to about 8 wt % imazaquin. In a particular embodiment, the formulation comprises about 17.68 wt % prodiamine (as, e.g., 97% prodiamine technical), about 27.2 wt % simazine (as, e.g., 97% simazine), and about 7.65 wt % imazaquin (as, e.g., about 97% imazaquin tech).

In one embodiment, the formulation consists of, on the basis of pounds active ingredient per gallon (lb/gal), a total of about 5.0 pounds active ingredients per gallon: about 1.68 pounds/gallon (lb/gal) prodiamine, about 2.59 lb/gal simazine, and about 0.73 lb/gallon imazaquin.

In at least one embodiment, the formulation comprises at least one agronomically acceptable excipient, such as adjuvant, solvent, non-ionic surfactant, crop oil concentrate, flow agent or anti-caking agent, emulsifier, surfactant, anti-foaming agent, or preservative. In one embodiment, the crop oil concentrate is added at about 1% v/v. In another embodiment, the surfactant is a non-ionic surfactant(s) added at about 0.25% v/v.

In another embodiment, the at least one agronomically acceptable excipient is selected from an adjuvant, a surfactant, a crop oil concentrate, a flow agent or an anti-caking agent (HISIL® 233), an emulsifier (Ethox P-104), an anti-freeze agent (polyethylene glycol), an anti-foaming agent (anti-foam FG-10), a dispersant (TERSPERSE® 2020), a biocide (PROXEL® GXL), or a thickener (KELZAN®).

In one embodiment, the formulation includes at least one excipient selected from water, HHISIL® 233 silica carrier, ETHOX P-104 emulsifier, propylene glycol, DEFOAM FG-10 antifoam emulsion, TERSPERSE® 2020 surfactant, PROXEL® GXL preservative, or KELZAN® xanthan gum. In a particular embodiment, the formulation comprises 67 wt % water, 1 wt % HHISIL® 233, 3 wt % ETHOX P-104, 5 wt % propylene glycol, 0.25 wt % DEFOAM FG-10, 1.24 wt % TERSPERSE® 2020, 0.1 wt % PROXEL® GXL), and 0.20 wt % KELZAN®. In one embodiment, the formulation is wet milled to form particles. In a particular embodiment, the formulation is wet milled to an average particle size of 4 microns (μm).

In one embodiment, the active ingredients in the formulation consists of about 17.68 wt % prodiamine, about 27.2 wt % simazine, about 7.65 wt % imazaquin; and excipients consists of about 67 wt % water, 1 wt % HHISIL® 233, 3 wt % ETHOX P-104, 5 wt % propylene glycol, 0.25 wt % anti-foam FG-10, 1.24 wt % TERSPERSE® 2020, 0.1 wt % PROXEL® GXL), and 0.20 wt % KELZAN®; and the formulation is prepared by wet-milling, for example, to a particle size of about 4 μm (average).

In another embodiment, the formulation is suitable for application in a spray volume of 10-40 gallon/acre.

In one aspect of the present embodiments, the formulation is suitable for application at a rate that ranges from about 34 fluid ounces/acre to about 69 fluid ounces/acre. For example, the application rate of the formulation is applied at 48 fluid ounces/acre or 69 fluid ounces/acre for the control of weeds such as *V. arvensis*.

Another aspect of the present embodiments provides a method of controlling weeds, such as *V. arvensis*, in turfgrass, comprising contacting the turfgrass with an herbicidally effective amount of a formulation consisting of (a) a combination of imazaquin, prodiamine, and simazine as active ingredients, and (b) at least one agronomically acceptable excipient as described herein. The formulation, as described herein, exhibits superior effective of control of *V. arvensis* post-emergence as compared with any one of the active ingredients administered alone. The formulation may be applied to grass selected from the group consisting of Bermuda grass, centipedegrass, St. Augustine grass and Zoysiagrass and is capable of controlling *V. arvensis* growth via pre-emergence or post-emergence application.

In yet another embodiment, the method comprises applying the formulation described herein in a range from about 34 fluid ounces/acre to about 69 fluid ounces/acre. For example, the method comprises applying the formulation at a rate selected from 34 ounces/acre (oz/A), 48 fluid oz/A, or 69 oz/A. In at least one embodiment of the method described herein, the formulation is applied in a total spray volume of 10-40 gallon/acre per treatment. In at least one embodiment of the method described herein, the formulation is applied prior to the emergence of said *V. arvensis*.

This and other aspects of the present embodiments will become more readily apparent through the following descriptions.

BRIEF DESCRIPTION OF THE DRAWINGS

FIG. 1 is a chart showing the percent *V. arvensis* control at 11 and 27 days after treatment or application (DDA) of an example formulation compared with commercial herbicides.

DETAILED DESCRIPTION

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

All patents and other publications identified are incorporated herein by reference for the purpose of describing and disclosing, for example, the methodologies described in such publications that might be used in connection with the present invention, but are not to provide definitions of terms inconsistent with those presented herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on information available to the applicants and do not constitute any admission as to the correctness of the dates or contents of these documents.

As used herein and in the claims, the singular forms "a," "an," and "the" include the plural reference unless the context clearly indicates otherwise. Throughout this specification, unless otherwise indicated, "comprise," "comprises" and "comprising" are used inclusively rather than exclusively, so that a stated integer or group of integers may include one or more other non-stated integers or groups of integers. The term "or" is inclusive unless modified, for example, by "either." Thus, unless context indicates otherwise, the word "or" means any one member of a particular list and also includes any combination of members of that list. As used herein, all numerical values relating to amounts, weight percentages and the like are defined as "about" or "approximately" each particular value, namely, plus or minus 10% (±10%), unless context clarifies otherwise. For example, the phrase "at least 5%" is to be understood as "at least 4.5% to 5.5%." In general, reference to % means % by weight (wt %).

Herbicides of many types have been reported in the literature and used commercially. In some instances, herbicidal active agents have been found more effective when used as a combination than when applied individually. In some instances, the efficacy of the combination is additive. In some instances, the efficacy of the combination is synergistic.

It has been surprisingly found that combining three different herbicides (prodiamine, imazaquin, and simazine) each differing in their respective modes-of-action can provide a single formulation having superior herbicidal activity in controlling *Veronica arvensis* (corn speedwell) post-emergence. In particular, the combinations formulation has increased herbicidal activity, compared with the activity expected from each component when applied individually. For example, SIM-TROL® 4L (simazine), according to its label and understood activity, may offer some preemergent control of winter annual weeds, such as annual bluegrass, burclover, lawn burweed, common and mouseear chickweed, corn speedwell, henbit, hop clover, spurweed, and parsley-piert. See SIM-TROL® 4L product label at p. 3, Sipcam Agro USA, Inc. (2017). Simazine, according to its label and understood use, is not known to have any post-emergence control of corn speedwell when applied alone. Similarly, prodiamine and imazaquin, according to their respective labels and understood use, are not known to have any post-emergence control of corn speedwell when applied alone or in combination. Surprisingly, the combination of all three herbicides—prodiamine, imazaquin, and simazine—is herbicidally effective in controlling corn speedwell post-emergence.

Definitions

The terms "turfgrass, "lawn" or "turf" are used in the following for describing more or less the same types of plant species which can be used for generating a high-quality lawn or turf. Therefore, when using the term "lawn" only, it defines plant species which can be used for turf as well and vice versa. The term "lawn" or "turf" describes all uses of well-maintained grass in golf courses, sports turf like football or soccer places, landscape situations, parks, home and gardens or all other situations were grasses are grown for achieving a well-maintained ground cover that is functional for all types of sport activities or for aesthetic purposes.

As used herein, "herbicide" and "herbicidal active ingredient" refers to an active ingredient that kills, controls or otherwise adversely modifies the growth and development of vegetation, particularly undesirable vegetation, such as weeds, volunteer crops and other plant species that differ from the plant species intended for growth, when applied in an appropriate amount.

As used herein, a "herbicidally effective amount" refers to an amount of an herbicidal active ingredient that causes a "herbicidal effect," i.e., an adversely modifying effect including, for instance, a deviation from natural growth or development, killing, necrosis, stunting, regulation, desiccation, and retardation.

The term "synergistically effective amount" indicates the quantity of the combination of herbicidal active ingredients which is capable of producing a controlling or modifying effect on the growth of plants, where said effect is greater than the sum of the effects obtained by applying each of the herbicidal active ingredients individually.

As used herein, "applying an herbicide or herbicidal composition" means delivering it directly to the targeted undesirable vegetation or to the locus thereof or to the area where control of undesired vegetation is desired. Methods of application include, but are not limited to preemergence, postemergence, foliar, soil, and in-water applications. Described herein are methods of controlling undesirable vegetation by applying certain herbicide combinations or compositions.

As used herein, plants and vegetation include, can include, for instance, dormant seeds, germinant seeds, emerging seedlings, plants emerging from vegetative propagules, immature vegetation, and established vegetation.

Application of the formulation can be done before, during and/or after, preferably during and/or after, the emergence of the undesirable vegetation.

As used herein, the terms "controlling" and "combating" are synonyms.

As used herein, the terms "undesirable vegetation", "undesirable species", "undesirable plants", "harmful plants", "undesirable weeds", or "harmful weeds" are synonyms.

As used herein, control of or controlling undesirable vegetation means killing or preventing the vegetation, or causing some other adverse modifying effect to the vegetation e.g., deviations from natural growth or development, regulation, desiccation, retardation, and the like.

The term "effective amount" means the amount of the formulation that will kill a weed. The "effective amount" will vary depending on the formulation concentration, the type of plants(s) being treated, the severity of the weed infestation, the result desired, and the life stage of the weeds during treatment, among other factors. Thus, it is not always possible to specify an exact "effective amount." An appropriate "effective amount" in any individual case may be determined by one of ordinary skill in the art.

The control of corn speedwell (*V. arvensis*) may be achieved by contacting grass and broadleaf with a herbicidally effective amount of a formulation consisting of (a) a combination of imazaquin, prodiamine and simazine as active ingredients; and (b) at least one agronomically acceptable excipient, wherein the formulation exhibits superior control of *V. arvensis* as compared with any of the active ingredients administered individually.

In one aspect of the present embodiments, the active ingredients in the herbicidal formulation are present as follows: about 16 wt % to about 19 wt % prodiamine, about 24 wt % to about 30 wt % simazine, and about 7 wt % to about 8 wt % imazaquin, each range inclusive. In a particular embodiment, the formulation comprises: about 17.68 wt % prodiamine, about 27.2 wt % simazine, and about 7.65 wt % imazaquin.

In another aspect of the present embodiments, the herbicidal formulation contains about 1.68 lb/gal of prodiamine, 2.59 lb/gal of simazine and 0.73 lb/gal of imazaquin.

Accordingly, in at least one embodiment, the ingredients of the herbicidal formulation include:

| Active Ingredient: | Wt % |
|---|---|
| Prodiamine | 17.68% |
| Imazaquin | 7.62% |
| Simazine | 27.20% |
| Other Ingredients: | 47.50% |
| Total: | 100.0% |

In a particular embodiment, the ingredients of the herbicidal formulation consist of:

| Ingredient: | Wt % | Lb/Gal |
|---|---|---|
| Water | 36.70 | 3.6039 |
| HISIL ® 233 | 1.00 | 0.0982 |
| Ethox P-104 | 3.00 | 0.2946 |
| Propylene Glycol | 5.00 | 0.4910 |
| Antifoam FG-10 | 0.25 | 0.0246 |
| TERSPERSE ® 2020 | 1.25 | 0.1228 |
| PROXEL ® GXL | 0.10 | 0.0098 |
| Prodiamine Technical (97%) | 17.68 | 1.7362 |
| Simazine (97%) | 27.20 | 2.6710 |
| Imazaquin Tech (97%) | 7.62 | 0.7483 |
| Kelzan ® | 0.20 | 0.0196 |
| Total | 100.00 | 9.8200 |

In yet another embodiment, the formulation provides the following active ingredients:

| | | Active Per Acre | |
|---|---|---|---|
| | Lb/Gallon | 48 oz/A | 69 oz/A |
| Prodiamine | 1.684091 | 0.6315 | 0.9078 |
| Simazine | 2.590909 | 0.9716 | 1.3967 |
| Imazaquin | 0.725835 | .2722 | 0.3913 |
| | 5.000835 | 1.8753 | 2.6958 |

In yet another aspect of the present embodiments provides an herbicidal formulation for warm-season turfgrasses, containing three active ingredients each differing in their mode-of-action, namely, imazaquin (Group 2-imidazolinones); prodiamine (Group 3-dinitroaniline); and simazine (Group 5-triazines); this formulation provides a broad weed control spectrum against grasses and broadleaves available in a single formulation.

In one aspect of the present embodiments, the formulation may be suitable for controlling the growth of a large number of pre-emergence weeds, such as alyssum, amaranths, annual bluegrass, annual morningglory, annual ryegrass, barnyardgrass (watergrass), black medic, *Brachiaria* spp., burclover, buttercup, carelessweed, carolina geranium, carpetweed, common chickweed, crabgrass (large, smooth), crowfootgrass, cutleaf evening primrose, dollarweed, dovetail, downey brome (cheat), eclipta, fall panicum, fiddleneck, field sandbur, filaree, fireweed, fivehook bassia, flora's paintbrush, florida pusley, foxtails, goosegrass, groundsel, hairy bittercress, henbit, johnsongrass (seedling), junglerice, knawel (German moss), knotweed, kochia, lambsquarters, lawn burweed, lovegrass, mouseear chickweed, mustard, nightshade, panicum (texas, fall, browntop), parsley-piert, perennial rye grass, pepperweed, pineappleweed, pigweed, prickly lettuce, prostate spurge, purple deadnettle, purslane, ragweed, rattail fescue, redmaids, red sorrel, rescuegrass (suppression only), russian thistle, shepherspurse, shieldscress, signalgrass (*Brachiaria* spp.), silver hairgrass, smartgrass, spanish needles, speedwell, sprangletop, tansymustard, white clover, wild oats, wild mustard, wiregrass, witchgrass, woolly cupgrass, yellow flower pepperweed, and yellow woodsorrel.

Surprisingly, the herbicidal activity of the formulation described herein, containing imazaquin, prodiamine and simazine, controls corn speedwell not only pre-emergence but post-emergence. More specifically, it is known that corn speedwell infestation is a hard to control with herbicides. The effect of the active compound combination according to the present embodiments is particularly strongly pronounced in concentrations described herein.

One aspect of the present embodiments provides a method of controlling corn speedwell in turfgrass, comprising contacting the turfgrass with the herbicidal formulation as described herein. In some embodiments, the formulation is applied at an application rate that ranges of from about 34 fluid ounce/acre to about 69 fluid ounce/acre, inclusive. For example, the application rate of the formulation is from about 34 fluid ounce/acre, or about 48 fluid ounce/acre, or about 69 fluid ounce/acre. For pre-emergence or post-emergence control of corn speedwell, the application rate of the formulation is in the amount of at least about 34 fluid ounce/acre or greater (e.g., 34, 36, 38, 40, 42, 44, 46, 48, 50, 52, 54, 56, 58, 60, 62, 64, 65, 66, 67, 68, or 69 fluid ounce/acre, inclusive, or amounts therebetween). Generally speaking, however, the application rate should not exceed 69 fluid ounce/acre to avoid damage to the turfgrass. All formulations and applications herein should follow regulatory agency guidelines.

Accordingly, in one aspect of the present embodiments, the amount of the active ingredients present in a 48 fluid oz/acre or 69 fluid oz/acre application includes at least about 0.63 lb/gal or 0.91 lb/gal of prodiamine; about 0.97 lb/gal or 1.4 lba/gal of simazine, and about 0.27 lb/gal or 0.39 lb/gal of imazaquin, respectively.

Depending upon the weed species, such as *V. arvensis* (corn speedwell), the formulation of the present embodiments may also provide both preemergence and early-postemergence activity. The maximum use rate may provide at least about 4 months of pre-emergence control under normal environmental conditions; however, control of some weeds may last longer than 4 months.

The present embodiments can be practiced with the four major warm-season turfgrasses including their varieties and hybrids. Examples of warm season turfgrasses include, for example, Bermudagrasses, Zoysiagrasses, St. Augustinegrass, Centipedegrass. Additional warm season turfgrasses include, for example, Bahiagrass and Seashore paspalum.

Application sites may include golf courses, parks, cemeteries, sod farms, athletic fields, commercial, and residential turfs, DOT/utility facilities and right-a-ways. Applications may be applied prior to target weed emergence (except Wild Onion/Garlic and Sedges) followed by 0.25 to 0.5 inch of rain and irrigation within 1-2 weeks.

In one aspect of the present embodiments, the formulation may also be suitable for controlling the growth of a large number of pre-emergence weeds, such as alyssum, amaranths, annual bluegrass, annual morningglory, annual ryegrass, barnyardgrass (watergrass), black medic, Brachiaria spp., burclover, buttercup, carelessweed, carolina geranium, carpetweed, common chickweed, crabgrass (large, smooth), crowfootgrass, cutleaf evening primrose, dollarweed, dovetail, downey brome (cheat), eclipta, fall panicum, fiddleneck, field sandbur, filaree, fireweed, fivehook bassia, flora's paintbrush, florida pusley, foxtails, goosegrass, groundsel, hairy bittercress, henbit, johnsongrass (seedling), junglerice, knawel (German moss), knotweed, kochia, lambsquarters, lawn burweed, lovegrass, mouseear chickweed, mustard, nightshade, panicum (texas, fall, browntop), parsley-piert, perennial rye grass, pepperweed, pineappleweed, pigweed, prickly lettuce, prostate spurge, purple deadnettle, purslane, ragweed, rattail fescue, redmaids, red sorrel, rescuegrass (suppression only), russian thistle, shepherspurse, shieldscress, signalgrass (*Brachiaria* spp.), silver hairgrass, smartgrass, spanish needles, speedwell, sprangletop, tansymustard, white clover, wild oats, wild mustard, wiregrass, witchgrass, woolly cupgrass, yellow flower pepperweed, and yellow woodsorrel.

In another aspect of the present embodiments, the formulation may be suitable for controlling the growth of a number of post-emergence weeds, such as annual bluegrass, dollarweed, corn speedwell (*V. arvensis*), hairy bittercress, henbit, knawl, purple deadnettle, white clover, wild garlic, and wild onions. The formulation should not be applied in excess of the maximum rate approved by regulatory authorities.

In yet another aspect of the present embodiments, the formulation, if applied at a maximum rate, e.g., 69 fluid ounce/acre, may be suitable for strongly suppressing a number of newly-emerged weeds, such as annual sedge (suppression only), bahiagrass (suppression only), buttercup, carpetweed, chickweed, cudweed (suppression only), cutleaf evening primrose, dandelion (suppression only), globe sedge, lawn burweed, parsley-piert, pennywort, purple nutsedge, red sorrel, rice flatsedge, tall fescue, violets (suppression only), yellow nutsedge, green kyllinga and field sandbur (suppression only).

The formulations of the present embodiments can be applied in conventional manner by using techniques as skilled person is familiar with. Suitable techniques include spraying, atomizing, dusting, spreading or watering. The type of application depends on the intended purpose in a well-known manner; in any case, they should ensure the finest possible distribution of the active ingredients according to the invention.

The compositions can be applied pre- or post-emergence, i.e., before, during or after emergence of the undesirable plants.

Formulations

In one aspect of the present embodiment, the compositions can also be formulated in form of water-soluble concentrates (SL), emulsifiable concentrates (EC), emulsions (EW), micro-emulsions (ME), suspension concentrates (SC), oil-based suspension concentrates (OD), flowable suspensions (FS), water-dispersible granules (WG), water-soluble granules (SG), wettable powders (WP), water soluble powders (SP), granules (GR), encapsulated granules (CG), fine granules (FG), macrogranules (GG), aqueous suspo-emulsions (SE), capsule suspensions (CS) and microgranules (MG). Preferred formulations are water-soluble concentrates (SL), water-dispersible granules (WG) and water-soluble granules (SG).

The formulations of the present embodiment include, besides the active ingredients, at least one agronomically acceptable excipient. Exemplary agronomically acceptable excipients may include but are not limited to, antifreeze agents, antifoam agents, compatibilizing agents, sequestering agents, anti-caking agents, neutralizing agents and buffers, corrosion inhibitors, colorants, odorants, penetration aids, wetting agents, spreading agents, dispersing agents, thickening agents, freeze point depressants, antimicrobial agents, crop oil, safeners, adhesives (for instance, for use in seed formulations), surfactants, protective colloids, emulsifiers, tackifiers, and mixtures thereof. Such agronomically acceptable excipients are known in the art and are commercially available. Their use in the formulation of the compositions of the present embodiment will be apparent to the person skilled in the art.

The composition may include one or more surfactants which are preferably non-ionic, cationic or anionic in nature and surfactant mixtures which have good emulsifying, dispersing and wetting properties, depending upon the active compound/compounds being formulated. Suitable surfactants are known in the art and are commercially available.

An exemplary agriculturally acceptable excipient may also include at least one non-ionic surfactant (NIS) at a concentration of about 0.25% v/v and/or at least one crop oil concentrate (e.g., mineral oil) at a concentration of about 1% v/v.

Addition of non-ionic surfactants (NIS) can optimize the performance of the herbicide formulation and reduce the number of products that the end user has to add to the mix.

Exemplary agronomically acceptable excipients may include one flow agent or anti-caking agent (e.g., Hisil® 233), emulsifier (e.g., Ethox P-104), anti-freeze agent (e.g., polyethylene glycol), anti-foaming agent (e.g., anti-foam FG-10), dispersant (e.g., Terspere® 2020), biocide (e.g., Proxel® GXL), or thickener (e.g., Kelzan®).

The compositions of the present embodiments may be formulated as suspension concentrates and derivatives thereof. The active ingredients may be incorporated into a suspension concentrate. The term "suspension concentrate" as used herein, means a composition also sometimes referred to as an "aqueous flowable" or a "water-based flowable" composition, which compositions are known in the herbicide art and include or consist of particles of a generally insoluble solid active herbicide compound in suspension (preferably concentrated suspension) in water. The suspension concentrates described herein can be produced with particles of the active ingredients by suspending and preferably dispersing the particles in water with the assistance of other ingredients such as conventional dispersants, surfactants (wetting agents), and other optional ingredients. The active ingredients should be in the form of particles that exhibit physical characteristics such as size, shape, surface features, etc., that will allow the active ingredient particles to be suspended in water as described. The particle size range can vary depending on factors such as the other ingredients used to prepare the suspension concentrate and their respective amounts, but exemplary particles may be in the size range below about 10 microns, for example in the range from about 4 or 5 microns to about 7 or 8 microns, inclusive.

The suspension concentrate typically includes water in a useful amount, such as an amount that, in combination with one or more other ingredients described herein (e.g., such as surfactant or dispersant) will allow suspension and preferably dispersion of the active ingredient particles. Relative amounts of water and the other ingredients used to prepare a suspension concentrate can be any amounts that produce a useful herbicide formulation in the form of a suspension concentrate. Relative amounts of different ingredients (water, active ingredients, surfactant, etc.) in any particular composition can depend on the intended application (including the plant to be controlled or the crop to be protected), the mode of application (e.g., field or aerial spraying or application from a hand-held spray applicator, or other technique), the method of any preparation from a suspension concentrate to a herbicide application composition, the amounts and identities of other ingredients added to the suspension concentrate, etc. Useful amounts of water in a suspension concentrate may be, for example, in the range from about 20 to about 60 wt % water based on the total weight of the suspension concentrate, such as from about 30 to about 50 wt % water in a suspension concentrate.

Wettable powders (sprayable powders) are products that are uniformly dispersible in water and that, in addition to the active ingredients and one or more diluents or inert substances, also comprise ionic or nonionic surfactants (wetting agents, dispersants), for example polyoxyethylated alkylphenols, polyethoxylated fatty alcohols or fatty amines, propylene oxide/ethylene oxide copolymers, alkanesulfonates or alkylbenzenesulfonates or alkylnaphthalenesulfonates, sodium lignosulfonate, sodium 2,2'-dinaphthylmethane-6,6'-disulfonate, sodium dibutylnaphthalenesulfonate or else sodium oleoylmethyltauride.

Emulsifiable concentrates may be prepared by dissolving the active ingredients in an organic solvent or solvent mixture, for example butanol, cyclohexanone, dimethylformamide, acetophenone, xylene or else higher-boiling aromatics or hydrocarbons with addition of one or more ionic or nonionic surfactants (emulsifiers). Examples of emulsifiers which may be used are: calcium alkylarylsulfonates such as calcium dodecylbenzenesulfonate, or nonionic emulsifiers such as fatty acid polyglycol esters, alkylaryl polyglycol ethers, fatty alcohol polyglycol ethers, propylene oxide-ethylene oxide copolymers, alkyl polyethers, sorbitan fatty acid esters, polyoxyethylene sorbitan fatty acid esters or polyoxyethylene sorbitol esters.

Dustable powders may be obtained by grinding the active ingredients with finely distributed solid substances, for example talc, natural clays such as kaolin, bentonite and pyrophyllite, or diatomaceous earth.

Oil dispersions are oil-based suspensions of active ingredients, where oil is to be understood as meaning any organic liquid, for example vegetable oils, aromatic or aliphatic solvents, or fatty acid alkyl esters. They can be prepared, for example, by wet grinding by means of commercially available bead mills and, if appropriate, addition of further surfactants (wetting agents, dispersants) as have already been mentioned, for example, above in the case of the other formulation types. In addition to the suspended active compound or active compounds, other active compounds may also be present in the formulation in dissolved form.

Emulsions, for example oil-in-water emulsions (EW), can be prepared, for example, by means of stirrers, colloid mills or static mixers from mixtures of water and water-immiscible organic solvents and, if appropriate, further surfactants as have already been mentioned, for example, above in the case of the other formulation types. Here, the active ingredients are present in dissolved form.

Granules can be prepared either by spraying the active ingredients onto adsorptive, granulated inert material or by applying active compound concentrates to the surface of carriers such as sand, kaolinites, chalk or granulated inert material with the aid of binders, for example polyvinyl alcohol, sodium polyacrylate or else mineral oils. Suitable active ingredients can also be granulated in the manner customary for the preparation of fertilizer granules—if desired as a mixture with fertilizers. Water-dispersable granules are produced generally by the customary processes such as spray-drying, fluidized bed granulation, pan granulation, mixing with high-speed mixers and extrusion without solid inert material. The production of pan granules, fluidized bed granules, extruder granules, and spray granules are known in the art. See, e.g., PROCESSES IN SPRAY-DRYING HANDBOOK (3rd ed., G. Goodwin Ltd., London, 1979); Browning, *Agglomeration, in* CHEMICAL & ENGINEERING, pages 147 (1967); PERRY'S CHEMICAL ENGINEER'S HANDBOOK, at 8-57 (5th ed., McGraw-Hill, New York 1973).

Details and protocols regarding the formulation of many herbicidal compositions are known in the art. See, e.g., Klingman, WEED CONTROL AS A SCIENCE, at 81-96 (John Wiley & Sons, Inc., New York, 1961); Freyer & Evans, WEED CONTROL HANDBOOK at 101-03 (5th ed., Blackwell Sci. Publ., Oxford, 1968).

The following examples are for illustrative purposes only. The examples are not intended as necessarily representative of the overall testing performed and are not intended to limit the invention in any way. As one skilled in the art is aware, in herbicidal testing, a significant number of factors that are not readily controllable can affect the results of individual tests and render them non-reproducible. For example, the results may vary depending on environmental factors, such as amount of sunlight and water, soil type, pH of the soil, temperature and humidity, among others. Also, the depth of planting, the application rate of individual and combined herbicides, the application rate of any antidote, and the ratio of the individual herbicides to one another and/or to an antidote as well as the nature of crops or weeds being tested can affect the results of the test. Results may vary from crop to crop within the crop varieties.

EXAMPLES

Example 1

Late Winter Pre-Emergence Herbicide Combination

A study was performed to confirm the herbicidal effect of an embodiment of the formulation described herein (designated "SA" below) has on weeds such as *V. arvensis* (corn speedwell) in common Bermudagrass turfgrass.

The test area was planted with conventional plots (four replications). Treatments were applied after the plantings (e.g., days after the plantings). The percent weed control was evaluated days after the treatment or applications (DAA) of the test herbicides or herbicide combinations. The results are presented in Tables 1-5. In all test plots and at all time points, Bermudagrass exhibited 0% injury by applications of the SA formulation. The results of SA in comparison of other herbicides on control of *V. arvensis* is shown in Table 1 and FIG. 1. This study showed the effective activity of an embodiment of the combination formulation in the control of corn speedwell (*V. arvensis*) compared with other commercially available herbicides or combinations.

TABLE 1

Effect of SA Treatment on control of *Veronica arvensis* (% control)

| Treatment | Rate | 11 DAA | 27 DAA | 40 DAA |
|---|---|---|---|---|
| Untreated | — | 0% | 0% | 0% |
| SA | 48 | 10% | 93.8% | 100% |
| SA | 69 | 15% | 96.3% | 100% |
| SA | 138 | 13.8% | 98.8% | 100% |
| SA + MSM | 69 + 0.5 | 11.3% | 76.3% | 100% |

TABLE 1-continued

Effect of SA Treatment on control of *Veronica arvensis* (% control)

| Treatment | Rate | 11 DAA | 27 DAA | 40 DAA |
|---|---|---|---|---|
| Specticle ® Flo | 4 | 7.5% | 48.8% | 65.0% |
| Specticle ® Flo | 6.5 | 0% | 30% | 68.8% |
| Echelon ® | 24 fl oz/a | 35% | 88.8% | 67.5% |

Key: Rate = fluid/oz/acre; DAA = Days After First/Last Application; SA = 17.68 wt % prodiamine, 27.2 wt % simazine, and 7.65 wt % imazaquin; MSM = 60% metsulfuron-methyl (Rometsol ®); Specticle ® Flo = 7.4% indiziflam (Bayer Enviromental Science); Echelon ® = 13.6% sulfentrazone and 27.3% prodiamine (FMC Corporation). All applications (except control) included 0.25% v/v NIS.

The results of the various treatments control of on the growth of annual bluegrass is shown in Table 2:

TABLE 2

Effect of SA Treatment on control of annual bluegrass (% control)

| Treatment | Rate (fluid oz/acre) | 11 DAA | 27 DAA | 40 DAA |
|---|---|---|---|---|
| Untreated | — | 0% | 0% | 0% |
| SA | 48 | 2.5% | 71.3% | 50.0% |
| SA | 69 | 3.8% | 86.3% | 75.0% |
| SA | 138 | 3.8% | 98.8% | 99.3% |
| SA + MSM | 69 + 0.5 | 6.3% | 83.8% | 91.3% |
| Specticle Flo | 4 | 0% | 0% | 0% |
| Specticle Flo | 6.5 | 0% | 2.5% | 0% |
| Echelon | 24 | 16.3% | 0% | 0% |

Key: DAA = Days After First/Last Application; SA = 17.68 wt % prodiamine, 27.2 wt % simazine, and 7.65 wt % imazaquin; MSM = 60% metsulfuron-methyl (Rometsol ®); Specticle ® Flo = 7.4% indiziflam (Bayer Environmental Science); Echelon ® = 13.6% sulfentrazone and 27.3% prodiamine (FMC Corporation). All applications (except control) included 0.25% v/v NIS.

The results of the various treatments control of on the growth of purple deadnettle is shown in Table 3:

TABLE 3

Effect of SA Treatment on control of purple deadnettle (% control)

| Treatment | Rate (fl oz/acre) | 11 DAA | 27 DAA | 40 DAA |
|---|---|---|---|---|
| Untreated | — | 0% | 0% | 0% |
| SA | 48 | 23.8% | 80.0% | 100.0% |
| SA | 69 | 33.8% | 95.0% | 100.0% |
| SA | 138 | 25.0% | 97.5% | 100.0% |
| SA + MSM | 69 + 0.5 | 31.3% | 95.0% | 100.0% |
| Specticle Flo | 4 | 11.3% | 71.3% | 37.5% |
| Specticle Flo | 6.5 | 6.3% | 87.5% | 75.0% |
| Echelon | 24 | 73.8% | 100.0% | 95.0% |

Key: DAA = Days After First/Last Application; SA = 17.68 wt % prodiamine, 27.2 wt % simazine, and 7.65 wt % imazaquin; MSM = 60% metsulfuron-methyl (Rometsol ®); Specticle ® Flo = 7.4% indiziflam (Bayer Environmental Science); Echelon ® = 13.6% sulfentrazone and 27.3% prodiamine (FMC Corporation). All applications (except control) included 0.25% v/v NIS.

The results of the various treatments control of on the growth of smooth crabgrass is shown in Table 4:

TABLE 4

Effect of SA Treatment on control of smooth crab grass (% control)

| Treatment | Rate | 27 DAA | 40 DAA | 55 DAA | 82 DAA | 105 DAA | 140 DAA | 168 DAA |
|---|---|---|---|---|---|---|---|---|
| Untreated | — | 0% | 0% | 0% | 0% | 0% | 0% | 0% |
| SA | 48 | 100% | 86.3% | 88.8% | 92.5% | 77.5% | 40.0% | 30.0% |
| SA | 69 | 100% | 91.3% | 100% | 100% | 91.3% | 71.3% | 53.8% |
| SA | 138 | 100% | 100% | 100% | 100% | 100% | 96.3% | 91.3% |
| SA + MSM | 69 + 0.5 | 100% | 95.0% | 98.8% | 100% | 93.8% | 66.3% | 55.0% |
| Specticle Flo | 4 | 100% | 100% | 87.5% | 57.5% | 25.0% | 0% | 17.5% |
| Specticle Flo | 6.5 | 100% | 100% | 97.5% | 85.0% | 65.0% | 30.0% | 22.5% |
| Echelon | 24 | 100% | 100% | 98.8% | 95.0% | 85.0% | 37.5% | 20.0% |

Key: Rate = fluid oz/acre; DAA—Days After First/Last Application; SA—17.68 wt % prodiamine, 27.2 wt % simazine, and 7.65 wt % imazaquin; MSM = 60% metsulfuron-methyl (Rometsol ®); Specticle ® Flo = 7.4% indiziflam (Bayer Environmental Science); Echelon ® = 13.6% sulfentrazone and 27.3% prodiamine (FMC Corporation). All applications (except control) included 0.25% v/v NIS.

The results of the various treatments control of on the growth of white clover is shown in Table 5:

TABLE 5

Effect of SA Treatment on control of white clover (% control)

| Treatment | Rate (fl oz/acre) | 55 DAA | 82 DAA | 105 DAA |
|---|---|---|---|---|
| Untreated | — | 0% | 0% | 0% |
| SA | 48 | 91.3% | 65.0% | 56.3% |
| SA | 69 | 87.5% | 45.0% | 43.8% |
| SA | 138 | 97.5% | 98.8% | 97.5% |
| SA + MSM | 69 + 0.5 | 100% | 100% | 97.5% |
| Specticle Flo | 4 | 50.0% | 25.0% | 42.5% |
| Specticle Flo | 6.5 | 32.5% | 42.5% | 22.0% |
| Echelon | 24 fl oz/a | 0% | 0% | 0% |

Key: DAA = Days After First/Last Application; SA = 17.68 wt % prodiamine, 27.2 wt % simazine, and 7.65 wt % imazaquin; MSM = 60% metsulfuron-methyl (Rometsol ®); Specticle ® Flo = 7.4% indiziflam (Bayer Environmental Science); Echelon ® = 13.6% sulfentrazone and 27.3% prodiamine (FMC Corporation). All applications (except control) included 0.25% v/v NIS.

Example 2

Evaluation Plot—Spring/Late-Winter Pre-Emergence Herbicide Evaluation

A study is performed on Bermudagrass to measure the herbicidal effect of herbicides, alone or on combination, have weeds such as on corn speedwell (*V. arvensis*). See Table 6. Test plots are tested in four replicates. The percent control is measured in comparison of growth per treatment compared with control. *V. arvensis* control is evaluated at 11 and 27 days after the treatment or applications (DAA). The herbicidal activity of an embodiment of the formulation described herein (designated "SA" below) is measured.

TABLE 6

Herbicides and test parameters

| Trt No. | Type | Treatment Name | Form Conc | Form Uni | Form Type | Rate | Rate Unit | Appl Code |
|---|---|---|---|---|---|---|---|---|
| 1 | Control | | | | | | | A |
| 2 | Herb | SA | 5 | LB/GAL | L | 34 | fl oz/a | A |
|   | Herb | MSM | 60 | % AW/W | WG | 0.5 | oz wt/a | A |
|   | Adj | NIS | 100 | % | SL | 0.25 | % v/v | A |
|   | Herb | SA | 5 | LB/GAL| | L | 34 | fl oz/a | B |
|   | Adj | NIS | 100 | % | SL | 0.25 | % v/v | B |
| 3 | Herb | SA | 5 | LB/GAL| | L | 69 | fl oz/a | A |
|   | Adj | NIS | 100 | % | SL | 0.25 | % v/v | A |
| 4 | Herb | SA | 5 | LB/GAL | L | 69 | fl oz/a | A |
|   | Herb | MSM | 60 | % AW/W | WG | 0.5 | oz wt/a | A |
|   | Adj | NIS | 100 | % | SL | 0.25 | % v/v | A |
| 5 | Herb | Specticle ® Flo | 0.62 | LB/GAL| | L | 6.5 | oz wt/a | A |
|   | Adj | NIS | 100 | % | SL | 0.25 | % v/v | A |
| 6 | Herb | SA | 5 | LB/GAL | L | 69 | fl oz/a | A |
|   | Herb | Sulfosulfuron | 75 | % AW/W | WG | 0.75 | oz wt/a | A |
|   | Adj | NIS | 100 | % | SL | 0.25 | % v/v | A |
| 7 | Herb | Simizine | 27.2 | LB/GAL| | L | 69 | oz wt/a | A |
|   | Adj | NIS | 100 | % | SL | 0.25 | % v/v | A |

Design: Randomized Complete Block (RCB), Treatment units: US standard, Treated 'Plot' experimental unit size Width: 5 feet, Treated 'Plot' experimental unit size Length: 10 feet, Application volume: 20 GAL/AC, Mix size: 3 L, Format definitions: G-All7.def, G-All7.FRM SA = 17.68 wt % prodiamine, 27.2 wt % simazine and 7.65 wt % imazaquin; MSM = 60% metsulfuron-methyl (Rometsol ® - ROTAM); Specticle ® FLO = 7.4% indiziflam (Bayer Environmental Science); NIS at 0.25% v/v is added to all herbicide.

TABLE 7

Product quantities required for listed treatments
and applications of trials included in Table 6:

| Amount Unit | Treatment Name | Form Conc | Form Unit | Form Type | Lot Code |
|---|---|---|---|---|---|
| 402.832 mL | SA | 5 | LBA/GAL | L | |
| 1.404 G | MSM | 60 | % AW/W | WG | |
| 56.244 mL | NIS | 100 | % | SL | |
| 1.053 G | Sulfosulfuron | 75 | % AW/W | WG | |

'Per area' calculations based on spray volume = 20 GAL/AC, mix size = 3 L (mix size basis). Product amount calculations increased 25% for overage adjustment. 'Per volume' calculations use spray volume = 20 GAL/AC, mix size = 3 L; NIS at 0.25% v/v is added to all herbicides; SA = 17.68 wt % prodiamine, 27.2 wt % simazine and 7.65 wt % imazaquin; MSM: 60% metsulfuron-methyl (Rometsol ® - ROTAM); Sulfosulfuron: 75% (Certainty ®, Monsanto Co.)

Example 3

Evaluation Plot—Fall Pre-Emergence Herbicide Combination Evaluation

A study is performed to measure the effect of embodiments of the formulation described herein with other commercial herbicides, in combination with or without additional herbicide(s), have on *V. arvensis* (corn speedwell). See Table 8. The percent weed control (e.g., *V. arvensis* control) is evaluated periodically after the treatment or applications (e.g., days after treatment or DAA) in comparison to the development of untreated control.

TABLE 8

| Trtmt | Products | Active Ingredients | Rate per acre (oz/Acre) | |
|---|---|---|---|---|
| A | SA + MSM fb | Prodiamine + Simazine + Imazaquin + MSM | 34 oz SA + .5 oz MSM fb 34 oz SA | 2nd application 6-8 weeks later (without MSM) |
| A | SA + MSM fb SA + SB | Prodiamine + Simazine + Imazaquin + MSM | 34 oz SA + .5 oz MSM fb 34 oz SA + SB | 2nd application 6-8 weeks later with embodiment + SB |
| B | SA | Prodiamine + Simazine + Imazaquin | 48-69 oz SA | |
| C | SA + MSM fb + SB | Prodiamine + Simazine + Imazaquin + SB | 48-69 oz SA + .5 oz fb SB | 2nd application 6-8 weeks later with SB |
| E | SB | Sulfosulfuron + MSM + Dicamba | XXX rate | Timing coincides with other second applications in trial. |
| F | Untreated | Untreated | | |
| G | | Simazine | | | fb = followed by; SA - 17.68 wt % prodiamine, 27.2 wt % simazine and 7.65 wt % imazaquin; MSM = 60% metsulfuron-methyl (Rometsol ® - ROTAM); SB = another experimental product formulation comprising Sulfosulfuron + MSM + Dicamba. NIS at 0.25% v/v is added to all herbicides.

I claim:

1. A method of controlling *Veronica arvensis* growth in turfgrass comprising contacting said turfgrass with a herbicidally effective amount of a formulation consisting of
   (a) a combination of imazaquin, prodiamine, and simazine as active ingredients, and
   (b) at least one agronomically acceptable excipient,
   wherein said formulation exhibits control of *V. arvensis* growth.

2. The method of claim 1, wherein said formulation exhibits superior control of *V. arvensis* post-emergence as compared with any one of the active ingredients administered alone.

3. The method of claim 1, wherein said grass is selected from the group consisting of Bermuda grass, centipedegrass, St. Augustine grass, and Zoysiagrass.

4. The method of claim 1, wherein said formulation is capable of controlling *V. arvensis* growth pre-emergence and post-emergence.

5. The method of claim 1, wherein said active ingredients are present in the formulation as follows: about 17.68 wt % prodiamine, about 27.2 wt % simazine, and about 7.65 wt % imazaquin.

6. The method of claim 1, wherein said formulation comprises about 1.68 lb/gal of prodiamine, about 2.59 lb/gal of simazine, and about 0.73 lb/gal of imazaquin.

7. The method of claim 1, wherein said agronomically acceptable excipient is selected from an adjuvant, surfactant(s), a crop oil concentrate, a flow agent or an anti-caking agent, an emulsifier, an anti-freeze agent (polyethylene glycol), an anti-foaming agent, a dispersant, a biocide, or a thickener.

8. The method of claim 7, wherein said crop oil concentrate is added at about 1% v/v.

9. The method of claim 7, wherein said surfactant is a non-ionic surfactant(s) added at about 0.25% v/v.

10. The method of claim 5, wherein said formulation further comprises about 67 wt % water, about 1 wt % anti-caking agent, about 3 wt % emulsifier, about 5 wt % propylene glycol, about 0.25 wt % anti-foaming agent, about 1.24 wt % dispersant, about 0.1 wt % biocide, and about 0.20 wt % thickener.

11. The method of claim 1, wherein the formulation is applied at a rate that ranges from about 34 fluid ounces/acre to about 69 fluid ounces/acre, inclusive.

12. The method of claim 11, wherein the application rate of said formulation is selected from the group consisting of about 34 fluid ounces/acre, about 48 fluid ounces/acre, and about 69 fluid ounces/acre.

13. The method of claim 11, wherein said application of said formulation is prior to the emergence of said *V. arvensis*.

14. The method of claim 1, wherein the formulation is wet milled to an average particle size of 4 microns (µ).

15. The method of claim 1, wherein the formulation is applied in a spray volume of about 10-40 gallon/acre, inclusive.

* * * * *